United States Patent
Choong

(10) Patent No.: US 8,811,248 B2
(45) Date of Patent: Aug. 19, 2014

(54) METHOD FOR EXTENDING BATTERY LIFE IN A WIRELESS DEVICE

(75) Inventor: Khong Neng Choong, Kuala Lumpur (MY)

(73) Assignee: Mimos Berhad, Kuala Lumpur (MY)

( * ) Notice: Subject to any disclaimer, the term of this patent is extended or adjusted under 35 U.S.C. 154(b) by 505 days.

(21) Appl. No.: 13/122,036

(22) PCT Filed: Sep. 18, 2009

(86) PCT No.: PCT/MY2009/000151
§ 371 (c)(1),
(2), (4) Date: Sep. 19, 2012

(87) PCT Pub. No.: WO2010/039022
PCT Pub. Date: Apr. 8, 2010

(65) Prior Publication Data
US 2013/0089015 A1 Apr. 11, 2013

(30) Foreign Application Priority Data
Oct. 3, 2008 (MY) .............................. PI 20083930

(51) Int. Cl.
*H04W 52/02* (2009.01)
*H04W 84/12* (2009.01)
*H04W 84/18* (2009.01)

(52) U.S. Cl.
CPC .......... *H04W 52/02* (2013.01); *H04W 52/0216* (2013.01); *H04W 84/12* (2013.01); *H04W 52/0229* (2013.01); *H04W 84/18* (2013.01)
USPC ....................................................... 370/311

(58) Field of Classification Search
CPC . H04W 52/02; H04W 52/0216; H04W 84/12; H04W 52/0229; H04W 84/18
See application file for complete search history.

(56) References Cited

U.S. PATENT DOCUMENTS

| 6,160,804 | A  | * | 12/2000 | Ahmed et al. | 370/349 |
| 6,690,659 | B1 | * | 2/2004  | Ahmed et al. | 370/328 |
| 6,735,202 | B1 | * | 5/2004  | Ahmed et al. | 370/392 |
| 8,238,983 | B2 | * | 8/2012  | Karaoguz et al. | 455/574 |
| 2012/0276876 | A1 | * | 11/2012 | Karaoguz et al. | 455/412.1 |

OTHER PUBLICATIONS

Yu-Chee Tseng; Jen-Jee Chen; Yu-Li Cheng, "Design and Implementation of a SIP-Based Mobile and Vehicular Wireless Network With Push Mechanism," Vehicular Technology, IEEE Transactions on , vol. 56, No. 6, pp. 3408,3420, Nov. 2007, doi: 10.1109/TVT.2007.906986.*

Qi Wang; Ali Abu-Rgheff, M., "Mobility management architectures based on joint mobile IP and SIP protocols," Wireless Communications, IEEE , vol. 13, No. 6, pp. 68,76, Dec. 2006 doi: 10.1109/MWC.2006.275201.*

Lakas, A.; Shuaib, K., "A framework for SIP-based wireless medical applications," Vehicular Technology Conference, 2005. VTC 2005-Spring. 2005 IEEE 61st , vol. 5, No., pp. 2755,2759 vol. 5, May 30-Jun. 1, 2005 doi: 10.1109/VETECS.2005.1543848.*

(Continued)

*Primary Examiner* — Andrew Lai
*Assistant Examiner* — Hoyet H Andrews
(74) *Attorney, Agent, or Firm* — Bill C. Panagos; Linda D. Kenedy; Butzel Long

(57) ABSTRACT

A method to extend battery life of a mobile device in a wireless network by means of specifying the wake-up condition at user level.

8 Claims, 7 Drawing Sheets

(56) References Cited

OTHER PUBLICATIONS

Catovic, A.; Narang, M.; Taha, A., "Impact of SIB Scheduling on the Standby Battery Life of Mobile Devices in UMTS," Mobile and Wireless Communications Summit, 2007. 16th IST , vol., No., pp. 1,5, Jul. 1-5, 2007 doi: 10.1109/ISTMWC.2007.4299075.*

Qi Wang; Ali Abu-Rgheff, M., (Wang et al.), titled "Mobility management architectures based on joint mobile IP and SIP protocols," (Wang hereinafter) Wireless Communications, IEEE, vol. 13, No. 6, pp. 68, 76, Dec. 2006, doi: 10.1109/MWC.2006.275201.*

Yu-Chee Tseng; Jen-Jee Chen; Yu-Li Cheng, (Tseng et al.), titled "Design and Implementation of a SIP-Based Mobile and Vehicular Wireless Network With Push Mechanism," (Tseng hereinafter), Vehicular Technology, IEEE Transactions on , vol. 56, No. 6, pp. 3408,3420, Nov. 2007 doi: 10.1109/TVT.2007.906986.*

Lakas, A.; Shuaib, K., "A framework for SIP-based wireless medical applications," Vehicular Technology Conference, 2005. VTC 2005-Spring. 2005 IEEE 61st , vol. 5, No., pp. 2755,2759 vol. 5, May 30-Jun. 1, 2005,doi: 10.1109/VETECS.2005.1543848.*

Seshasayee, B.; Nathuji, R.; Schwan, K., "Energy-Aware Mobile Service Overlays: Cooperative Dynamic Power Management in Distributed Mobile Systems," Autonomic Computing, 2007. ICAC '07. Fourth International Conference on , vol., No., pp. 6,6, Jun. 11-15, 2007, doi: 10.1109/ICAC.2007.14.*

Catovic, A.; Narang, M.; Taha, A., "Impact of SIB Scheduling on the Standby Battery Life of Mobile Devices in UMTS," Mobile and Wireless Communications Summit, 2007. 16th IST , vol., No., pp. 1,5, Jul. 1-5, 2007, doi: 10.1109/ISTMWC.2007.4299075.*

Perozzo, R.F.; Pereira, C.E., "Management of services in Intelligent Environments for mobile devices," Intelligent Environments, 2008 IET 4th International Conference on , vol., No., pp. 1,6, Jul. 21-22, 2008.*

* cited by examiner

METHOD FOR EXTENDING BATTERY LIFE IN A WIRELESS DEVICE

CROSS REFERENCE TO RELATED APPLICATIONS

The present application is a 35 U.S.C. §371 national stage filing of International Patent Application No. PCT/MY2009/000151, filed Sep. 18, 2009, and through which priority is claimed to Malaysian Patent Application No. PI20083930, filed Oct. 3, 2008, the disclosures of which are incorporated herein by reference in their entireties.

FIELD OF INVENTION

The present invention relates generally to mobile wireless communications devices. More particularly, the present invention relates to a method for extending the battery life of wireless communications devices by user specified wake-up conditions.

BACKGROUND OF INVENTION

Battery life of wireless devices is one of the major concerns for wireless network operators and one of the main parameters describing user experience with new wireless devices.

Wireless communication devices are increasingly becoming capable of providing a wide-range of functions such computing capabilities, Internet access, electronic mail, text messaging, GPS mapping, digital photographic capability, an audio/MP3 player, video gaming capabilities, video broadcast reception capabilities and the like. However, many of these features and functions are power intensive applications that are characterized by high rates of battery power consumption.

On top of these, being connected to a WLAN has also an impact on the battery consumption of theses devices. 802.11 MAC WLAN protocol defines only to mode of operation in which the mobile device can operate i.e. Active Mode (AM) or Power Saving Mode (Power Saving Mode). In current implementations, when in sleep state, the wireless device wakes up in regular time intervals to read system information which is broadcasted by the network. This is because the mobile device is unable to determine the destination of the packet until it receives it. Further to this, the mobile host also has to perform a handover at every Access Point cell boundary in order to maintain association with the Access Point.

SUMMARY OF INVENTION

It is an object of the present invention to provide a method to extend the battery life of a mobile wireless device. The objection is achieved by means of an Intelligent Wakeup Service which provides a method for the user to specify the wake-up condition of the device at the application layer so that the mobile device will remain in Power Saving Mode (Power Saving Mode) until the user specified conditions are met.

DETAILED DESCRIPTION

The present invention will now be described with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In IEEE802.11 MAC protocol for Wireless Local Area Network (WLAN) a mobile device operates in either Active Mode (AM) or Power Saving Mode (Power Saving Mode). Thus oe of the best ways to conserve battery in order to extend battery life is to allow the device to remain in Power Saving Mode as long as possible.

Figure 1:
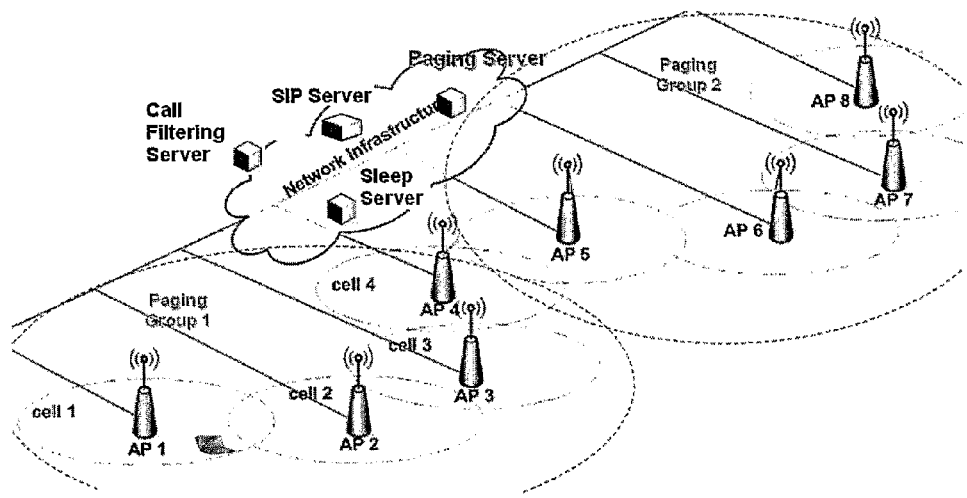
FIG. 1 Overall network infrastructure for Intelligent Wake-up Service
FIG. 2 Component Interaction
FIG. 3 Registration of Client Application to Sleep Server
FIG. 4 Registration of Sleep Client to Sleep Server
FIG. 5 Sleep Server Main Process
FIG. 6 Session Initiation Protocol Server Message Forwarding Process
FIG. 7 Call Filter Server Main Process
FIG. 8 Sleep/Wake-up service registration And Execution

A mobile device may be used for various applications such as video conferencing, instant messaging, FIG. 1 is exemplary network infrastructure where the present invention will be used. The various components illustrated in the figure are the major components used by network operators and service providers to provide wakeup service. The detailed description of the present invention will be divided into:

Components of the Intelligent Wake Up Service
Intelligent Wake-Up Service Process
A. Components of Intelligent Wake-Up Service
Sleep Server The Sleep Server (SS) is the central point where all the Intelligent Wake-Up Service (IWS) setup is managed. A mobile device first registers itself with the SS before entering Power Saving Mode or sleep mode. Examples of mobile devices are such as mobile communication devices and mobile computers. At this point the mobile device provides a list of basic parameters such as the client information and client network information in order to allow the Sleep Server to manage its pre-configured wakeup condition and later to wake up the specific device.

The wakeup process is carried out by the Sleep Server together with the Call Filtering server. Call Filtering server is responsible for processing the wake-up condition configured by the mobile user. It runs as an application server on top of the Session Initiation Protocol server.

Another function of the Sleep Server is to act on-behalf-of the "sleeping" mobile device, particularly for Session Initiation Protocol (SIP)-based application. In the Session Initiation Protocol protocol, it is a must for the mobile device to periodically send the keep-alive packet to the Session Initiation Protocol server, to inform the Session Initiation Protocol server that the mobile device is available and reachable.

It would not be power efficient if the mobile device is periodically required to wake-up in order to send a keep-alive packet to the Session Initiation Protocol server, and then re-enter its sleep state. Therefore, the Sleep Server sends the keep-alive packet to the Session Initiation Protocol server once the mobile device is registered with the Sleep Server. By this means the mobile device remains in its sleep state without any intermediate associated send and sleep disturbance.

This sleep state is also known as improved Power Saving Mode (iPower Saving Mode).

Call Filtering Server

Figure 5:
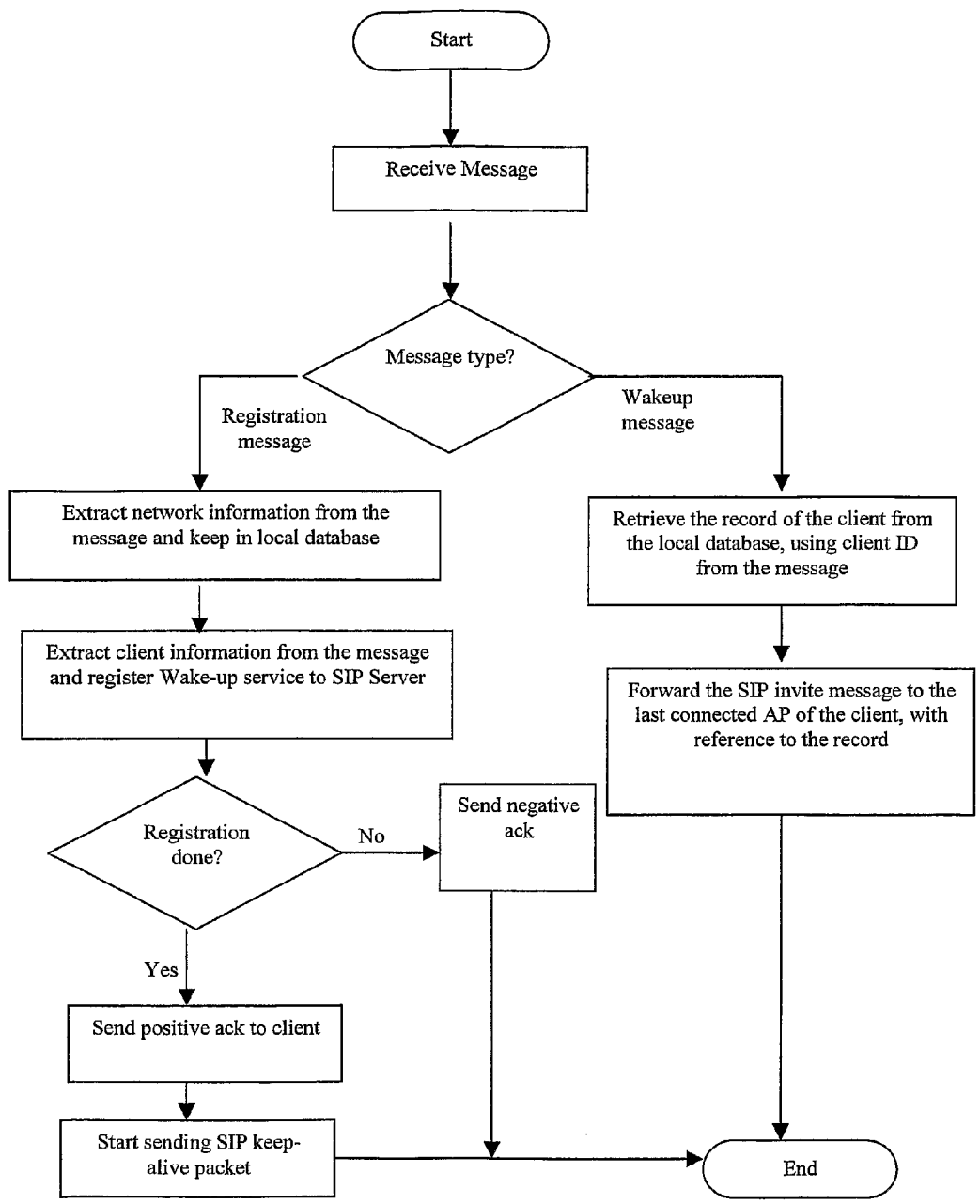
Figure 7:
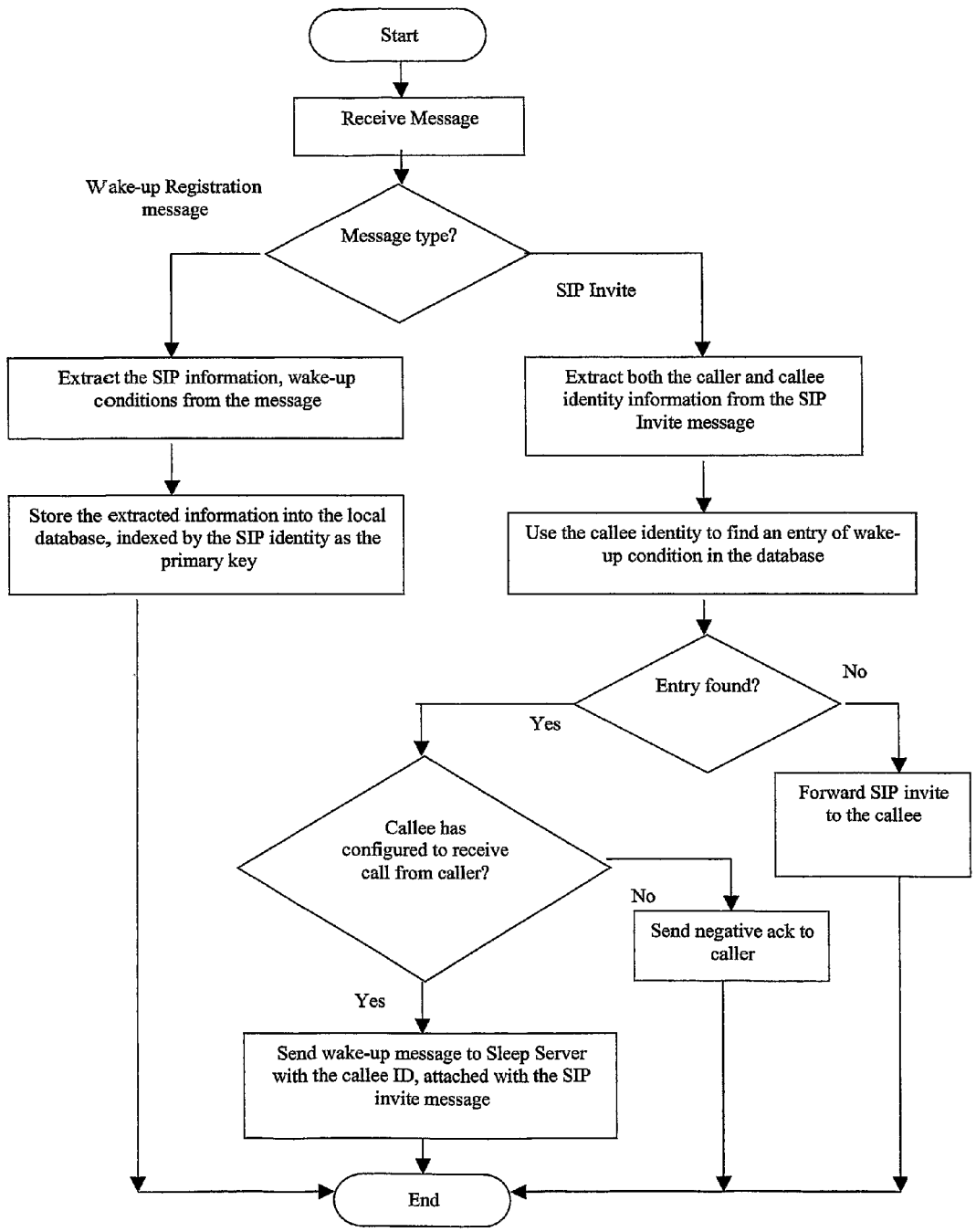
Figure 8:
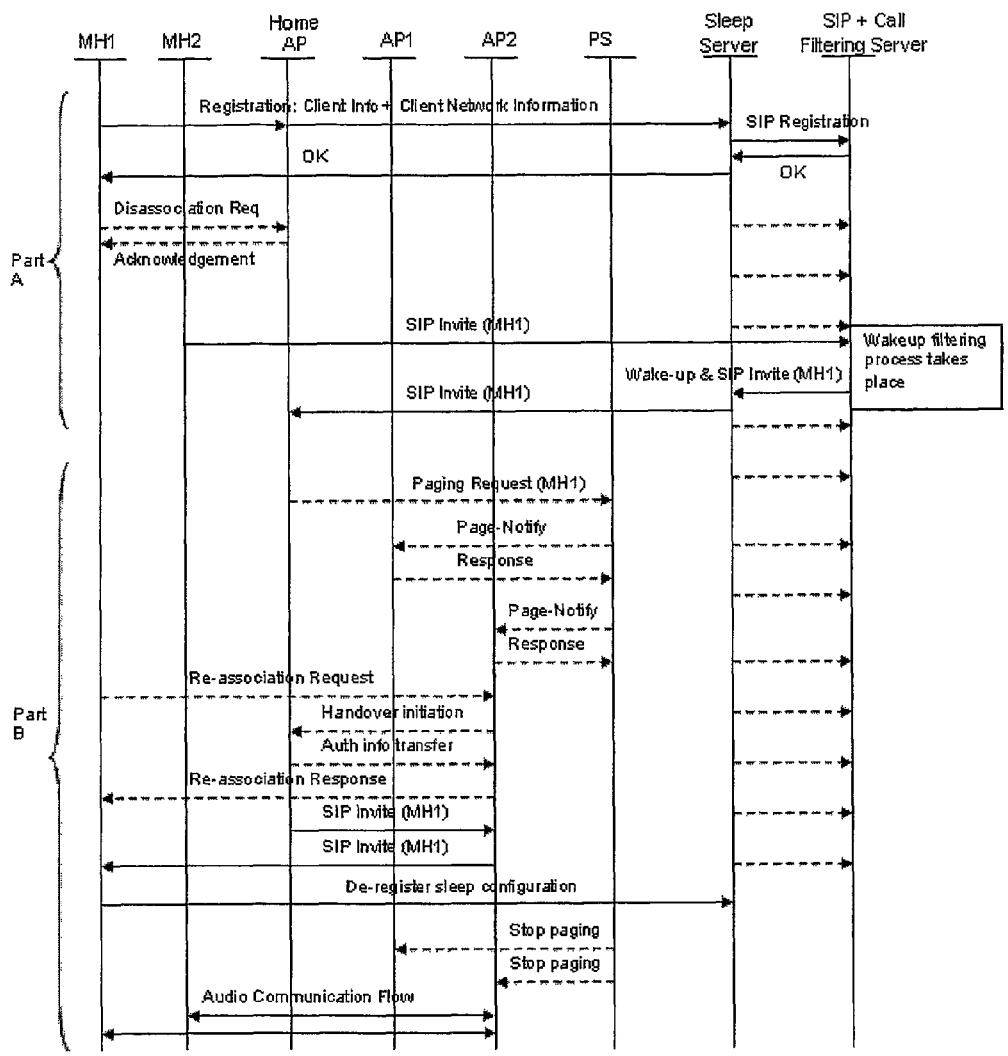

This server is responsible for screening each Session Initiation Protocol invite message, i.e. to check on the condition or status of the target recipient of the message. The target recipient here is the mobile device which is in Power Saving Mode. If the Call Filtering server finds the mobile device to be iPower Saving Mode, and also finds that the Session Initiation Protocol invite message fulfills all of the pre-configured wake up condition/s, specific process as shown in FIGS. 5, 7 and 8 will be employed to wake-up the specific mobile device. The processes illustrated in FIGS. 5, 7 and 8 will be discussed in detail hereafter.

Session Initiation Protocol Server

Session Initiation Protocol server manages all Session Initiation Protocol sessions and provides linkage to application server such as the Call Filtering server described above. When the server receives a Session Initiation Protocol message from a Session Initiation Protocol client, it can opt to forward the message to the application server for further processing, based on the forwarding configuration at the Session Initiation Protocol server. Alternatively the server will process the Session Initiation Protocol message. In the present invention, when the Session Initiation Protocol registration message carries the keyword "Sleep Config" in its header, it will be forwarded to the Call Filtering server for further processing.

Paging Server (PS)

PS is used as a mean to locate, wake up and reach the specific mobile device in the network or Access Point (AP). All Access Points must be registered with the Paging Server for a successful paging. Upon receiving a paging message, the mobile device will establish a connection with the Access Point.

Figure 2:
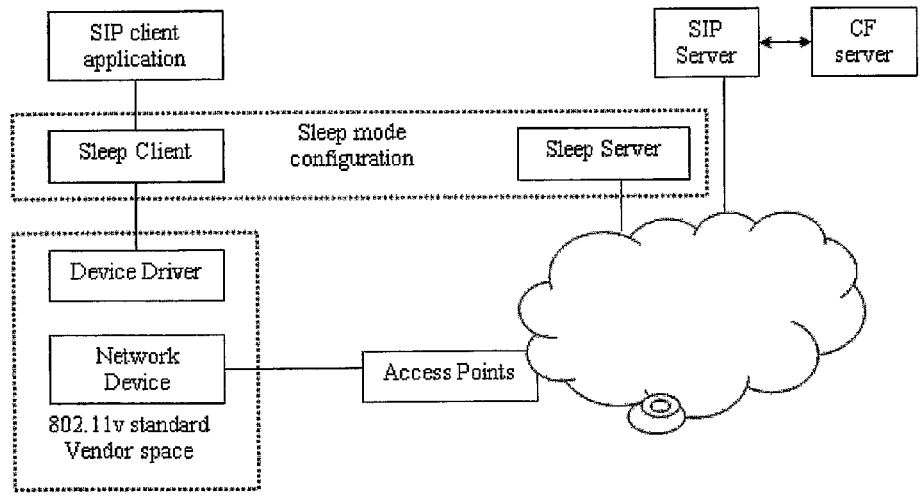

FIG. 2 shows the correlation between the different client components and the server components.

In general, Session Initiation Protocol client applications must register with the Sleep Client daemon or program installed on the client device, in order to gain the benefits of iPower Saving Mode. The Sleep Client then passes the configuration and wake-up conditions to the Sleep Server, through the underlying device driver, that supports the 802.11v framework. The Sleep Server shall then forward the registration and configuration message to the Call Filtering server via the Session Initiation Protocol server. Detailed interactions between these components are shown in FIGS. 3 to 7.

B. Intelligent Wake-Up Service Process

Registration of Client Application to Sleep Client

Figure 3:
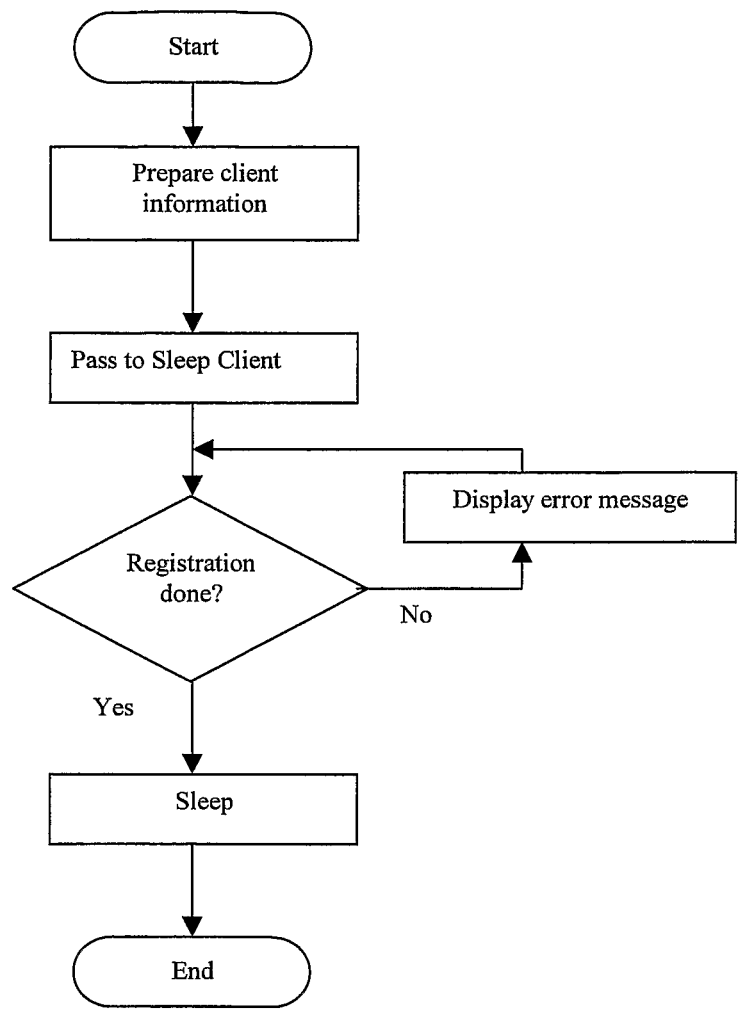

FIG. 3 illustrates the process of a client application being registered to Sleep Client, which is the client system program that provides the iPower Saving Mode service to the client application. Client application here is defined as a Session Initiation Protocol based application such as VoIP application, which requests to use the Intelligent Wake-up Service. The Session Initiation Protocol client prepares the client information consisting of the process ID, Session Initiation Protocol address/identity, application type, and application wake-up condition.

The wake-up conditions could be configured in 2 ways. The first way is through a GUI where user constructs a white-list (i.e. a list of phone numbers that has the privilege to wake up the iPSM device). This could be done by selecting and adding the selected phone numbers from the phone book into the white-list. The white-list is then saved into the local storage for the SIP-based application to read, and later pass to the Sleep Client. Experienced user could modify the white-list file directly if needed, without the need of using the GUI.

The second method to configure the wake-up condition is by the Sleep Client reading the white-list directly from the local storage. By doing this, the SIP-based application does not need to manage on the configuration of application wake-up condition.

Examples of these conditions can be found in Table 1. Next, this information is handed over through a library call to the Sleep Client for registration. Any error along this process will trigger an error message display. However, if there is no error encountered, the system will enter the iPower Saving Mode as proposed by the present invention. The registration process is consist further step of a registration message from the Sleep Client is sent to the remote Sleep Server. The Sleep Server then proceeds to register itself with the Session Initiation Protocol server and Call Filtering Server.

Table 1 shows an example of wake-up condition configuration with few types of possible applications and 2 common wake-up conditions.

TABLE 1

| | Wake up Condition | |
|---|---|---|
| Application Type | Filtered by Caller | Filtered by Time |
| Instant messaging | Caller identity | Time duration |
| Emailing | Sender identity | Time duration |
| Phone call | Caller identity | Time duration |
| Video conferencing | Caller identity | Time duration |

The 'time duration' in the table above can be further explained as the time between which the device should be woken up. For example the user can set for the device to be in active mode i.e. wake-up between 5-10 pm.

The above conditions can also be configured with a more advance option. For example, for e-mail applications, the user can set up the wake-up condition to be such that the e-mail is filtered by its contents, whereby the mobile device is only to be woken if the subject contains pre-selected keywords.

Table 2 shows another possible configuration of the wake-up condition. In this example the wake-up condition is set to be receipt of 3 continuous call from the same caller or an emergency call. An example of an emergency call here will be one triggered by the user's home alarm system.

TABLE 2

| Configuration of Wake-Up Condition | | |
|---|---|---|
| Any application | 3 continuous call attempts | On/Off |

Registration of Sleep Client to Sleep Server

Figure 4:
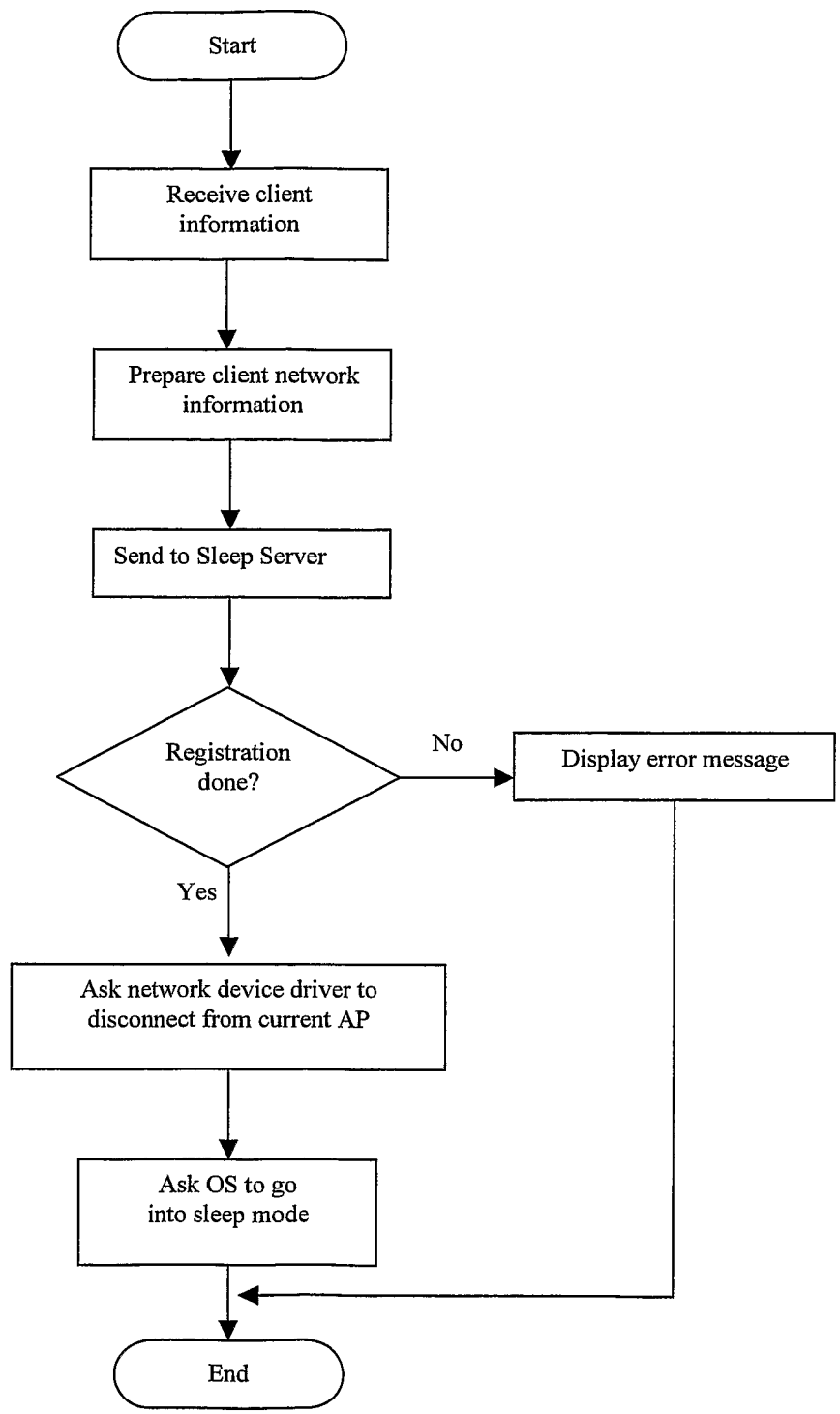

Referring now to FIG. 4, when a registration message is received from the client application, the sleep client prepares the below listed client network information:

Paging server ID
Paging group
Client information
Current connected Access Point
Client IP and MAC addresses Pursuant to this, the client information and client network information will be sent to the Sleep Server for registration. The Sleep Client will enter iPower Saving Mode once the registration has been successful and a system call to the Operating System is made. However, if an error is encountered during the registration process, an error message will be sent to the client application.

Sleep Server Registration Process

FIG. 5 is an overview of the Sleep Server registration process. The process is initiated when a message is received from the Sleep Client. The message is verified. If the message received is a registration message from the Sleep Client, the Sleep Server will then proceed to extract the client network information that consists of the paging server ID, paging group ID, current Access Point of client, as well as the client IP and MAC addresses from the message and store them into a database.

Synchronously, the client information that consists of the process ID, Session Initiation Protocol address/identity, application type, and application wake-up condition will be extracted and used for registration to the Session Initiation Protocol server.

The Sleep Server suspends until the completion of Session Initiation Protocol Server registration. An acknowledgement message will be sent to the sleep client, upon successful registration. The sleep server undertakes to send the keep-alive message promptly after a successful registration. On the other hand, an error message will be returned to the sleep client if the Session Initiation Protocol Server registration was unsuccessful.

Figure 6:
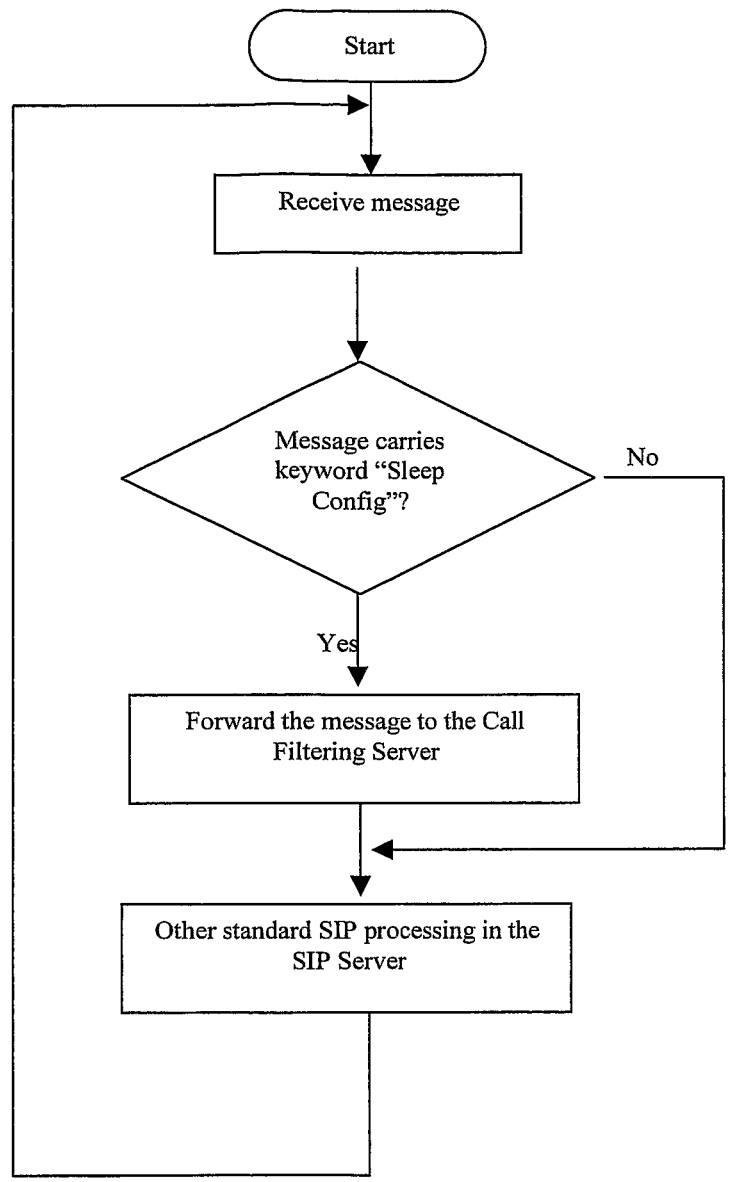

Hereinafter the procedure of handling the wake-up message shall be discussed together with the Call Filtering main execution flow as shown in FIG. 6.

Session Initiation Protocol Server Standard Main Process

As shown in FIG. 6, the Session Initiation Protocol Server conducts a verification to determine whether the message body of the message that has been received contains the keyword "Sleep Config". Standard Session Initiation Protocol process commences if the message body does not contain the said keyword. However, if the message body contains "Sleep Config", the message will then be forwarded to the CF Server.

Call Filtering Server Execution Process

Referring now to FIG. 7, the CF Server will assess the message to determine its type. If the message is found to be a registration message from the Sleep Server, the CF Server will then proceed to extract the Session Initiation Protocol information and the wake-up condition for the specific Session Initiation Protocol client. The extracted information will then be stored into a database using the Session Initiation Protocol identity (or Uniform Resource Identifier [URI]) as the primary key.

The other possible type of message that can be received is a Session Initiation Protocol invite message. This type of message indicates the intention of the caller to contact the client who is currently is Power Saving Mode. When this type of message is received, the CF server will extract the Session Initiation Protocol identity (or URI) of both the caller and the client from the message. The CF server then identifies the possible entry of wake-up condition from its database, by using the client's Session Initiation Protocol identity.

If the client is in Power Saving Mode, then a valid entry would be found.

This will bring to the next step of call filtering process. In this process verification is carried out to determine if the client has pre-configured for messages to be received from the respective caller. A specific wake-up message will be sent to the Sleep Server, attaching the Session Initiation Protocol invite message to be forwarded to the client, if the client pre-configuration indicates that messages from the caller is to be received. If the caller is not pre-configured by the client, then a negative Session Initiation Protocol acknowledgement message will be sent to the caller.

However, if the CF Server is unable to find a valid entry in its database, which is an indication that the device is not in the Power Saving Mode of the present invention, the Session Initiation Protocol invite will be forwarded directly to the client as usual.

Referring back to FIG. 5, the Sleep Server will retrieve the record of the client from its local database to obtain the client's network information when it receives a wake-up message and attached Session Initiation Protocol invite message from the CF server. The Sleep Server will use the client's network information to forward the Session Initiation Protocol invite message to the Access Point that the client is connected to.

The next step is to page the client in Power Saving Mode. The client is paged by known paging methods.

The process for registering, filtering and paging the client in Power Saving Mode will now bee described in the following section with reference to FIG. 8. The dotted lines in the figure denotes the known protocol used to page mobile devices, whereas the solid lines are indicative of the novel protocol of the present invention, which will be explained below.

A mobile host 1 (MH1) registers with the Sleep Server before entering Power Saving Mode. Parameters such as the client information as well as the client's network information are sent to the Sleep Server.

Upon receiving the registration message, the Sleep Server retains a record of the message and proceeds with registration with the Session Initiation Protocol and Call Filtering server.

Upon receiving positive acknowledgement message from the Sleep Server, MH1 will enter Power Saving Mode, by sending a Disassociation Request and receiving an Acknowledgement messages to and from the Access Point.

Now a second mobile host (MH2) joins the network and wishes to communicate with MH1. As it is a Session Initiation Protocol-based application, MH2 will first send a Session Initiation Protocol INVITE message to the Session Initiation Protocol or Call Filtering Server. The Session Initiation Protocol server will relay the message to the Call Filtering Server, which runs the server application that implements intelligent wakeup service. The server application could be programmed according to the conditions that the operator or service provider would provide. For example, the application server will proceed to wake up MH1 if MH2 was previously configured by MH1 as an acceptable or interested caller during its sleep mode. MH2 is identified as an acceptable or interested caller by its Session Initiation Protocol address.

Next, the Call Filtering Server will relay the Session Initiation Protocol INVITE message to MH1, through MH1 Home Access Point which is the Access Point registered to the server. However, it is possible that MH1 has been relocated and is connected to a Access Point other than the Access Point registered with the CF Server, while in Power Saving Mode. Therefore, the Home Access Point will request for the help of the PS to page MH1 using existing protocol. Once MH1 is paged and located, the Session Initiation Protocol Invite message can be received by MH1. Subsequently, an audio communication could take place between MH1 and MH2.

The series of dotted lines from the Sleep server to the Session Initiation Protocol or Call Filtering server represents the Session Initiation Protocol keep-alive message, which also represent the overall sleep duration of the client device. Sleep Server will cease to send the keep-alive message once MH1 accepts the Session Initiation Protocol invite message. MH1 will send a de-register message to the Sleep Server via the Sleep Client.

Another possible application is e-mail. When the application is e-mail the wake-up process is similar to the wake-up process of a call application. The difference between the processes is that there is no Session Initiation Protocol interaction involved and the Sleep Server is responsible for always probing the email server for email from specific sender as the condition of waking up the mobile host, when the application is e-mail.

The invention claimed is:

1. A method to extend battery life of a mobile device in a wireless network by means of retaining the device in power saving mode until pre-configured wake-up conditions, which are set prior to the device entering its power saving mode, are met, comprising the steps of:
registering the mobile device to a sleep server to discontinue the mobile device waking-up periodically to verify the network packets;
registering the Sleep Server to a Session Initiation Protocol server and Call Filtering Server to allow the Sleep Server to be contacted when a caller attempts to communicate with the mobile device;
sending Session Initiation Protocol message from caller to Call Filtering Server to forward the said message to the mobile device;
verifying the Session Initiation Protocol message from caller to determine if the message meets the pre-defined wake-up conditions; and
forwarding the Session Initiation Protocol message from caller to mobile device to wake-up the mobile device.

2. A method according to claim 1, wherein the wake-up conditions for various applications executable on the mobile device is pre-defined at the time of registering the device to the Sleep Server.

3. A method according to claim 1, wherein any Session Initiation Protocol message to be sent to a mobile device is power saving mode is first sent to the Call Filtering Server.

4. A method according to claim 1, wherein the Caller Filtering Server determines if the caller sending the Session Initiation Protocol message fulfils the pre-defined wake-up conditions.

5. A method according to claim 1, wherein the Call Filtering Server will contact the mobile device to forward the Session Initiation Protocol message from the caller if the caller meets all the wake-up conditions.

6. A method according to claim 5, wherein the Call Filtering Server will contact the mobile device through the device's Home Access Point.

7. A method according to claim 6, wherein the Call Filtering Server will engage the Paging Server to contact the mobile device if the mobile device is no longer connected to its Home Access Point.

8. A method according to claim 1, wherein the Sleep Server sends keep-alive message on behalf of the mobile device when the mobile device is registered to the Sleep Server in order to maintain the mobile device's connection to the network.

\* \* \* \* \*